(12) United States Patent
Saraya et al.

(10) Patent No.: US 11,562,136 B2
(45) Date of Patent: Jan. 24, 2023

(54) DETECTING PROGRAMMING LANGUAGE DEFICIENCIES COGNITIVELY

(71) Applicant: International Business Machines Corporation, Armonk, NY (US)

(72) Inventors: Siddharth K. Saraya, Raniganj (IN); Manish Kataria, New Delhi (IN); Kushal Mukherjee, New Delhi (IN); Rajmeet S Singh Bal, Gurgaon (IN)

(73) Assignee: International Business Machines Corporation, Armonk, NY (US)

( * ) Notice: Subject to any disclaimer, the term of this patent is extended or adjusted under 35 U.S.C. 154(b) by 670 days.

(21) Appl. No.: 16/437,545

(22) Filed: Jun. 11, 2019

(65) Prior Publication Data
US 2020/0394264 A1 Dec. 17, 2020

(51) Int. Cl.
*G06F 40/216* (2020.01)
*G06N 5/04* (2006.01)
*G06F 16/30* (2019.01)
*G06N 20/00* (2019.01)
*G06F 40/12* (2020.01)
*G06F 8/30* (2018.01)

(52) U.S. Cl.
CPC ............ *G06F 40/216* (2020.01); *G06F 16/30* (2019.01); *G06F 40/12* (2020.01); *G06N 5/04* (2013.01); *G06N 20/00* (2019.01); *G06F 8/30* (2013.01)

(58) Field of Classification Search
CPC . G06F 16/30; G06F 40/12; G06F 8/30; G06F 8/75; G06F 8/31; G06F 40/30; G06N 5/04; G06N 20/00
See application file for complete search history.

(56) References Cited

U.S. PATENT DOCUMENTS

| | | | |
|---|---|---|---|
| 9,563,420 B2 | 2/2017 | Osminer et al. | |
| 9,841,969 B2 | 12/2017 | Seibert, Jr. et al. | |
| 10,635,855 B1* | 4/2020 | Schroeder | G06F 40/169 |
| 10,740,634 B1* | 8/2020 | Katsuki | G06K 9/629 |
| 2007/0180429 A1* | 8/2007 | Gogh | G06F 11/3672 |
| | | | 717/126 |

(Continued)

OTHER PUBLICATIONS

Kevic et al. "Tracing Software Developer's Eyes and Interactions for Change Tasks". ESEC-FSE'15, Aug. 30-Sep. 4, 2015, Bergamo, Italy, pp. 202-213 (Year: 2015).*

(Continued)

*Primary Examiner* — Jesse S Pullias
(74) *Attorney, Agent, or Firm* — Jorge R. Maranto

(57) ABSTRACT

A method and a system for agitation detection and response for a programming language are provided. The method includes collecting software code and activity data pertaining to one or more activities performed by a developer that is using a segment of a programming language. The method also includes evaluating the activity data to generate an agitation level of the developer when using the segment of the programming language. The method can also include generating a developer context by evaluating the software code. The developer context can include insights into the operation of features in the programming language by the developer. The activity and developer context can be provided to a software development provider for independent analysis.

17 Claims, 6 Drawing Sheets

(56) References Cited

U.S. PATENT DOCUMENTS

| | | | | |
|---|---|---|---|---|
| 2014/0033183 A1* | 1/2014 | Brown | ................ | G06F 11/3636 |
| | | | | 717/131 |
| 2014/0149177 A1* | 5/2014 | Frank | ...................... | G06F 40/30 |
| | | | | 705/7.29 |
| 2015/0082277 A1* | 3/2015 | Champlin-Scharff | ....................... | |
| | | | | G06F 11/3664 |
| | | | | 717/120 |
| 2018/0060224 A1* | 3/2018 | Shavro | ................ | G06F 11/3684 |
| 2018/0081911 A1 | 3/2018 | Mowatt et al. | | |
| 2018/0113782 A1* | 4/2018 | Valacich | ............. | G06F 11/3419 |

OTHER PUBLICATIONS

Calefato et al. "Sentiment Polarity Detection for Software Development". Empirical Software Engineering 2018, 23:1352-1382 (Year: 2018).*

Muller et al. "Stuck and Frustrated or In Flow and Happy: Sensing Developer's Emotions and Progress". 2015 IEEE/ACM 37th IEEE International Conference on Software Engineering, Florence, Italy, pp. 688-699 (Year: 2015).*

StackExchange API. https://api.stackexchange.com/docs . Archive from May 16, 2018. (Year: 2018).*

Disclosed Anonymously, "Method and System for Providing Recommendation Based on Software Development Struggle Detection," An IP.com Prior Art Database Technical Disclosure, IP.com No. IPCOM000252955D, Feb. 23, 2018, 4 pages. https://ip.com/IPCOM/000252955.

* cited by examiner

DETECTING PROGRAMMING LANGUAGE DEFICIENCIES COGNITIVELY

BACKGROUND

The present disclosure relates to computer programming, and more specifically, to determining an agitation level of developers programming with a specific programming language.

Historically, only a select offering of programming languages were robust enough to provide for large scale development. Restrictions such as licensing costs, migration hurdles, and language library capabilities also restricted developers. However, the programming language landscape has changed considerably in recent years. Due to the push for open source languages, software development kits (SDK), and specialized libraries, developers are no longer tied to certain programming languages and can choose a programming language best suited for a given assignment.

SUMMARY

Various embodiments are directed to a method of detecting developer agitation levels. The method can include collecting software code and activity data pertaining to one or more activities performed by a developer that is using a segment of a programming language. The method also includes evaluating the activity data to generate an agitation level of the developer when using the segment of the programming language. The method can also include generating a developer context by evaluating the software code. The developer context can include insights into the operation of features in the programming language by the developer. The activity and developer context can be provided to a software development provider for independent analysis.

Further embodiments are directed to a computer program product for detecting developer agitation levels on a system, which can include a computer readable medium having program instructions therewith, the program instructions executable by a processor to cause the system to execute instructions. The instructions can cause the system to collect software code and activity data pertaining to one or more activities performed by a developer that is using a segment of a programming language. The instructions can cause the system to evaluate the activity data to generate an agitation level of the developer when using the segment of the programming language. The instructions can also cause the system to generate a developer context by evaluating the software code. The instruction can also cause the system to provide the agitation level and the developer context to a software development provider.

Additional embodiments are directed to a system, which can include at least one processing component, at least one memory component, the memory component having program instructions which cause the processor to collect developer data pertaining to one or more activities performed by a developer that is using a segment of a programming language. The instructions can cause the system to apply a first machine learning model to the developer data to generate an agitation level of the developer when using the segment of the programming language. The instructions can also cause the system to compare the agitation level with an agitation benchmark to determine a deviation in the agitation level and the agitation benchmark. The agitation benchmark can relate to an average agitation level corresponding to the activity a typical developer experiences when using the segment of the programming language. A second machine learning model can be applied to the deviation and the activities to generate a course of action to reduce the deviation.

BRIEF DESCRIPTION OF THE DRAWINGS

These and other features, aspects, and advantages of the embodiments of the disclosure will become better understood with regard to the following description, appended claims, and accompanying drawings where:

Figure 1:
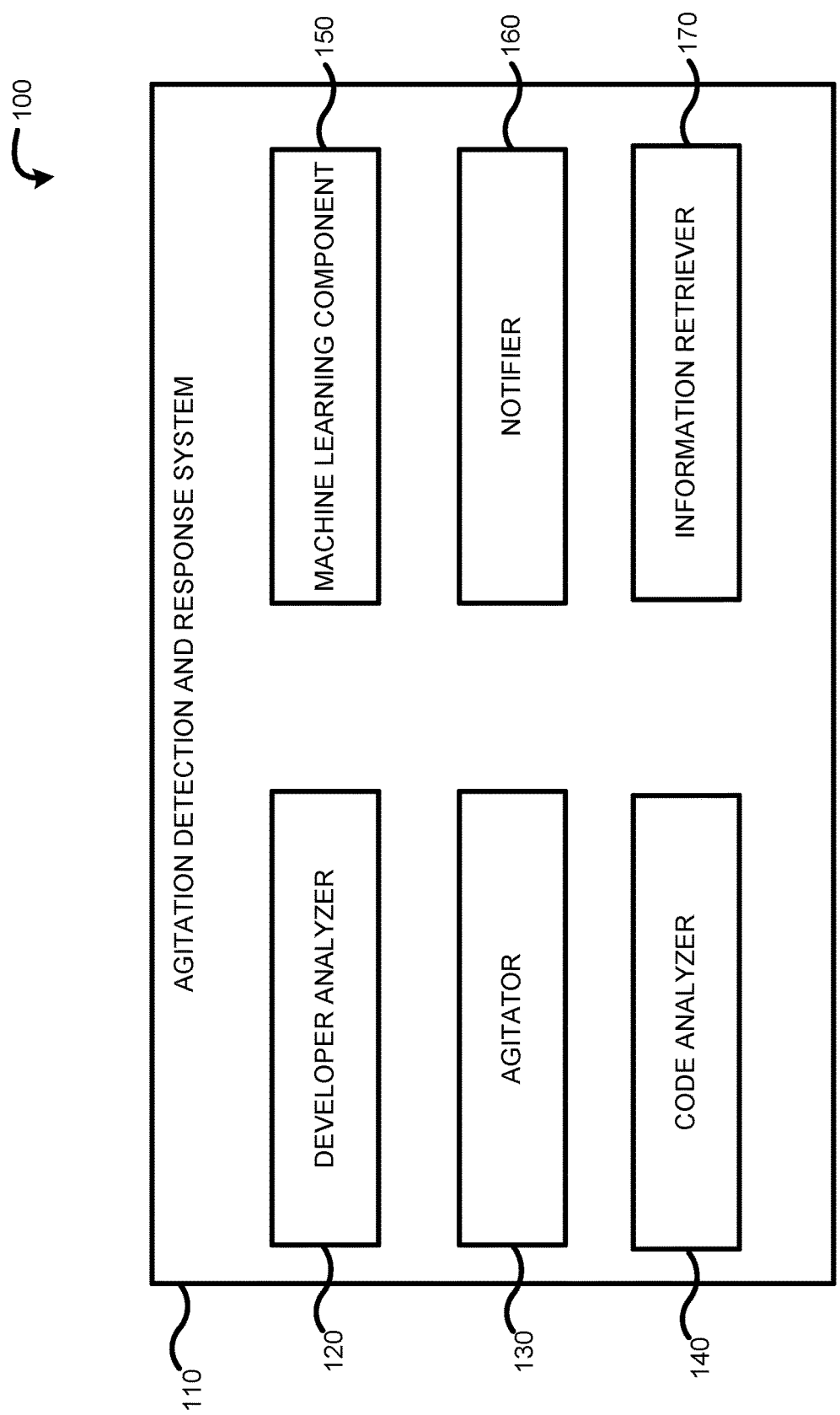
FIG. 1 is a block diagram illustrating an agitation detection system, according to embodiments of the present disclosure.

While the disclosure is amenable to various modifications and alternative forms, specifics thereof have been shown by way of example in the drawings and will be described in detail. It should be understood, however, that the intention is not to limit the particular embodiments described. On the contrary, the intention is to cover all modifications, equivalents, and alternatives falling within the scope of the disclosure. Like reference numeral are used to designate like parts in the accompanying drawings.

DETAILED DESCRIPTION

Traditionally, applications have been written using established programming languages that are licensed to developers. These licenses, such as general public license (GPL), Berkley Software Distribution (BSD), and a Massachusetts Institute of Technology (MIT) License, can potentially create complications for developers. For example, A GPL may prohibit developers from commercializing the software developed. As a result, developers were historically restricted to a select handful of programming languages capable of providing the freedom and capabilities a developer might need to develop an application.

In recent years, there has been a strong push in the development community for open source programming languages. "Open source" refers to a program in which the source code is available to the public, free of cost, for use or for modification from its original design. On top of being provided the source code, developers using open source programming languages typically are free to redistribute their work and are generally not restricted by burdensome licensing agreements.

As a result of developers choosing open source programming languages, a large variety of programming languages have been developed. Many of these programming languages are specialized to match the particular needs a developer may have when developing certain software. The software development providers that develop and provide these programming languages utilize the combined effort of other developers to improve upon the source code. The developers and the software development providers can share their changes with the general public. However, there are limited ways for developers to provide and receive feedback to and from the software development providers. One such way is for developers to post questions and comments on community forums related to specific programming languages in the hope that the software development provider responds. To bridge the gap between developer and software development provider, an agitation detection system can collect, analyze, and report data directly to software development providers to assist developers using open source programming languages.

Disclosed herein are a method and a system for agitation detection and response. The method can collect data from the developer that pertains to an activity they are doing while using a segment of a programming language. The segment can be any portion, function, code, library, or any other capability related to the programming language. A machine learning model can be used to develop an agitation level of the developer. The agitation level can be used to detect possible difficulties a developer may be having with a certain segment of the programming language. A comparison can be made of the agitation level of the developer against benchmark agitation levels to determine if there is a deviation between the levels. A second machine language model can then be used to generate a possible course of action the programming language provider can use to improve the programming language.

FIG. 1 is a block diagram illustrating a computing environment 100, according to embodiments of the present disclosure. The computing environment 100 includes an agitation detection and response system 110. The agitation detection and response system 110 includes a developer analyzer 120, an agitator 130, a code analyzer 140, a machine learning component 150, a notifier 160, and an information retriever 170. In some embodiments, the computing environment is attached to an existing integrated development environment (IDE) used by a developer.

The agitation detection and response system 110 is a component of the computing environment 100 configured to detect an agitation level of a developer, analyze code, and to provide that information to a programming language provider.

The developer analyzer 120 is a component of the agitation detection and response system 110 configured to capture activities performed by the developer. These activities can include, but are not limited to, eye movement, cursor movement, compiler statistics, and physical sensors placed around the developer. These activities can be collected individually or collectively to produce activity data that can be used by the agitation detection and response system 110 to determine an agitation level of the developer. The developer analyzer 120 is further configured to parse the activities by segments included in the programming language. For example, activities can be segmented into parts when a developer writes a function or method. It can further be segmented by various features and capabilities of the programming language that are used by the developer.

The agitator 130 is a component of the agitation detection and response system 110 configured to determine an agitation level of a developer. The agitator 130 can determine the agitation level of the developer by analyzing the activities detected by the developer analyzer 120. The agitator 130 can quantify the eye movement, cursor movement, and other detected activities into an agitation scale that determines the agitation level of the developer given those activities. For example, a developer may have an agitation level of 75 based on a predetermined scale of 0-100. For a given activity, a predetermined baseline agitation benchmark may be 35. When the agitator 130 determines an agitation level of a developer that is greater than the predetermined baseline agitation level, that may be an indication that there is a deficiency in the programming language that may be hindering the developer.

The agitator 130 is further configured to provide the agitation level to a software development provider for further analysis. For example, the agitator 130 can specify the activity performed and the agitation level of the developer performing the activity. This can provide insight to the software development provider about any possible deficiencies in the programming language. Also, the detected agitation level may be an indicator of the skill level of the developer. Novice developers, unfamiliar with the various functionalities of a programming language may initially struggle as they code. In some embodiments, the agitator 130 adjusts the baseline agitation benchmark to correspond to the current skill level of the developer. This adjustment can also be adjusted for a skilled developer with a lower agitation level.

The code analyzer 140 is a component of the agitation detection and response system 110 configured to generate a developer context. A developer context can provide insight into the software code written by the developer to determine possible deficiencies in the software language. The code analyzer 140 is further configured to parse the software code into developer comments and source code. The developer comments and the source code can be analyzed individually and together to determine the developer context. The code analyzer can then provide the developer context to a software development provider providing the programming language used by the developer.

The machine learning component 150 is a component of the agitation detection and response system 110 configured to generate an agitation cause. In some embodiments, the machine learning component 150 applies the agitation level and the developer context of the developer to generate the agitation cause. The agitation cause can be a determination as to what may be the reason for the agitation level of the developer. For example, if a developer has a high agitation level compared to the agitation benchmark and the code that was written is longer than usual for a given function, then the agitation cause may be that the programming language is deficient in offering certain libraries or it does not provide sufficient documentation as to how to implement certain functionalities.

In some embodiments, the agitation cause can be transmitted to a developer community server. A developer community server may be a server that provides community feedback in a forum type setting (e.g., GitHub® (a trademarked product of GitHub, Inc. for providing programming collaboration features) and Stack Overflow® (a trademarked product of Stack Exchange Inc. for providing a question and answer site to programmers)). Once the agitation cause is received by the developer community server, a community response can be received from the developer community server. The community response can then be provided back to the developer to assist the developer. The community response can include suggestions from other developers that may have possible solutions that can alleviate the agitation level of the developer. Also, by providing the agitation cause to the developer community server, the software development provider can also evaluate the cause to possibly improve upon the programming language.

The notifier 160 is a component of the agitation detection and response system 110 configured to provide notifications to the developer. The notifier 160 can include notifications such as an update notification regarding a segment of the programming language that the developer had higher agitation levels with. For example, a software development provider received an elevated agitation level and/or a negative developer context within the software for a given segment. If the software development provider made changes to that segment of the programming language, the software development provider can notify the developer of those changes using the notifier 160.

The notifier 160 is further configured to monitor a developer community server for possible responses from the community regarding possible changes or advice for the programming language. The notifier 160 can notify the developer of those comments to allow the developer to see if that information is pertinent to their development.

The information retriever 170 is a component of the agitation detection and response system 110 configured to retrieve information and data from a server. For example, the information retriever 170 can retrieve community responses from a developer community server and it can retrieve update notifications from the software development provider. The information retriever 170 can retrieve aggregated data that includes agitation levels and developer contexts from the developer and other developers. Included with the agitation level and the developer context, the aggregated data can be provided to the software development provider for analysis.

Figure 2:
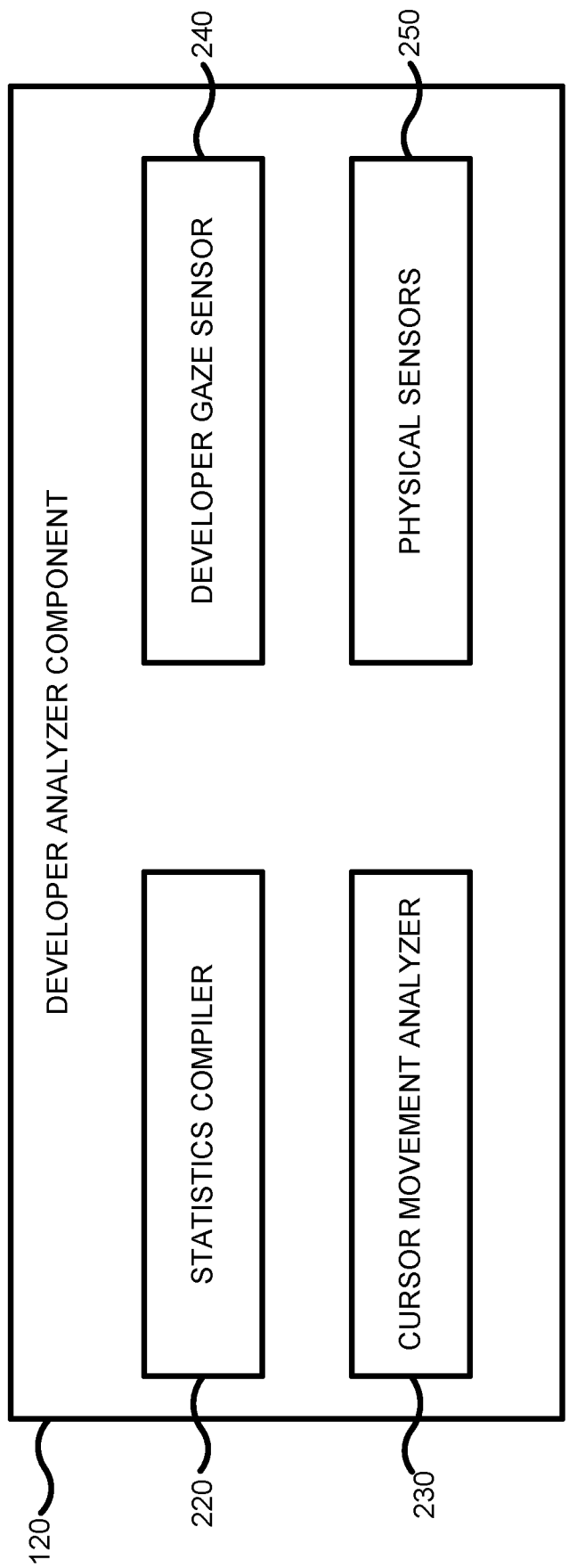
FIG. 2 is a block diagram illustrating the developer analyzer of the agitation detection system in FIG. 1, according to embodiments of the present disclosure.

FIG. 2 is a block diagram of the developer analyzer 120 of FIG. 1, according to embodiments of the present disclosure. The developer analyzer 180 includes a statistics compiler 220, a cursor movement analyzer 230, a developer gaze sensor 240, and physical sensors 250.

The statistics compiler 220 is a component of the developer analyzer 120 configured to generate compiler statistics on the software code of the developer. For example, when a compiled software code generates an error in the code, that error, as well as other compiled information, can be gathered for further analysis. Also, the statistics compiler 220 is further configured to divide the errors by segment to provide statistics for each segment of the programming language.

The cursor movement analyzer 230 is a component of the developer analyzer 120 configured to track the cursor movement of the developer while they write software code. The cursor movement may provide insight as to what the developer has their attention on. For example, if the developer continuously goes to a particular drop-down menu or if the movements become erratic, then the focus of the developer may be diminished for a given segment. The diminished focus may result in a higher agitation level by the developer. The cursor movement may also give insight to the software development provider into what features of the programming language are frequently used and what features are neglected. This software development provider can then tailor the updates to focus on the features that are most frequently used, or they can attempt to adjust features so that developers use other features more frequently.

The developer gaze sensor 240 is a sensor of the developer analyzer 120 configured to track the gaze of the developer. The tracked gaze of the developer can provide fixations and gaze points to measure levels of interests in particular segments of the programming language. In some embodiments, the developer gaze sensor 240 provides heat maps of the display which show a general distribution of gaze points. This can provide for a visual representation as to which segments or elements attract the most attention of the developer. In some embodiments, the developer gaze sensor 240 tracks the amount of time per fixation. This can provide insight as what features and segments are prioritized by the developer or which lines of code the developer may be focused on. The time spent on a particular segment may indicate a level of interest, where longer times may be of particular interest or agitation for a developer, while shorter times may be of less interest with less agitation.

The physical sensors 250 are sensors of the developer analyzer 120 configured to detect, measure, and record physical properties of a developer using a programming language. The physical sensors 250 can include a chair sensor, heart rate sensor, temperature sensor, and any other known sensor capable of monitoring an individual.

In some embodiments, the developer analyzer 120 provides the compiler statistics, the cursor movement, the developer gaze, and the physical sensor data to the agitator 130 for generating an agitation level of the developer. Each piece of information can be analyzed separately or combined by the agitator 130 to determine an agitation level.

Figure 3:
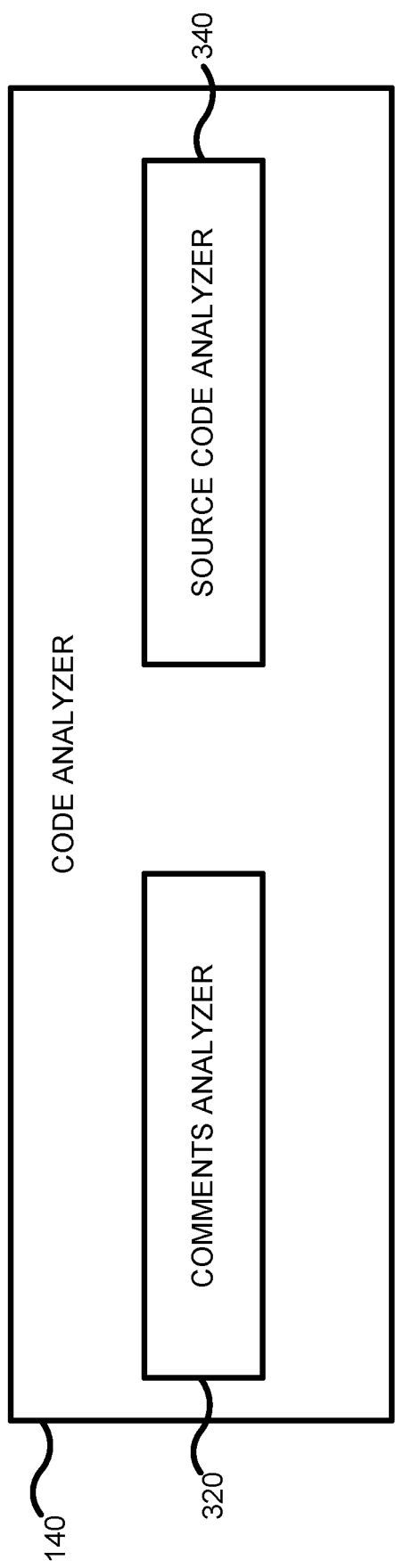
FIG. 3 is a block diagram illustrating the code analyzer of the agitation detection system in FIG. 1, according to embodiments of the present disclosure.

FIG. 3 is block diagram of the code analyzer 140 of the agitation detection and response system 110 in FIG. 1. The code analyzer 140 includes a comments analyzer 320 and a source code analyzer 340.

The comments analyzer 320 is a component of the code analyzer 140 configured to analyze developer comments in the software code. The comments analyzer 320 is further configured to detect special annotations in the software code instructing the code analyzer 140 on how to interpret the software code. For example, a special annotation can be written into a comment of the developer that indicates the subsequent code contains sensitive material and is not to be analyzed by the system 110. Other annotations may be used to allow or prevent access to certain segments of the software code as the developer see fits. The comments analyzer can further interpret the comments by analyzing the amount of comments left by the developer for a given segment, as well as, the space between each individual comment to gain further insight into the developer context of the developer.

The source code analyzer 340 is a component of the code analyzer 140 configured to analyze source code written by a developer. The source code analyzer 340 can analyze the amount of code written for a given segment to determine the level of effort needed to accomplish a function. The source code can also be weighed against other code to determine whether the developer is efficiently using the various available libraries offered by the programming language in use. For example, if a developer attempts to write a function when a library containing pre-written code for that function exists, then the source code analyzer 340 can flag those lines of code as unnecessary. Other indicators may be present within the source code that can assist the system 110 in determining the overall developer context.

Figure 4:
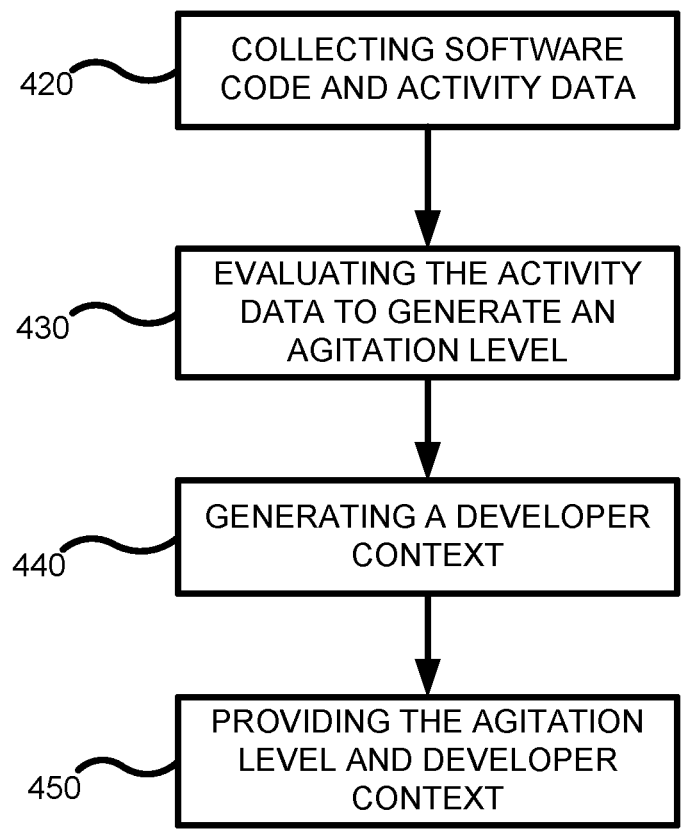
FIG. 4 is a flow diagram illustrating a process of detecting an agitation level, according to embodiments of the present disclosure.

FIG. 4 is a flow diagram illustrating a process 400 for agitation detection and developer context, according to embodiments of the present disclosure. To illustrate process 400, FIG. 4 is described within the context of the agitation detection and response system 110 of FIG. 1.

The developer analyzer 120 collects activity data and the code analyzer 140 collects software code. This is illustrated at step 420. The developer analyzer 120 can use the various sensors and information to gather activity data on the developer. Depending on the configuration established by the agitation detection and response system 110, certain activity data may be excluded from being collected. The developer can selectively choose which type of activity data to send for analysis. For example, the developer may elect to not use sensors or to only provide compiler statistics. The code analyzer 120 retrieves the software code written by the developer corresponding to the activity data collected.

In some embodiments, activity data and software code are continuously sent to the agitation detection and response system 110. Transmission of the information can be performed at a predefined interval or after a segment of the programming language has been used. Other means of transmission may be available and possible as the developer sees fit.

In some embodiments, only software code is collected. In some other embodiments, only activity data is collected. The agitation detection and response system 110 can be configured in such a way that allows a developer to select the type of information to provide and when to provide it.

The activity data is evaluated by the agitator 130 to generate an agitation level of the developer. This is illustrated at step 430. The agitation level can be an indication of the amount of agitation the developer is experiencing while using a segment of a programming language. The agitator 130 can take each activity performed by the developer and quantify an agitation number for that specific activity. This can be accomplished by comparing the agitation of the developer against predefined activities with predefined agitation numbers. For example, the number of times a developer gets out of his chair can be quantified and compared to other developers performing similar tasks on a particular segment of the programming language. Once each activity is quantified, the aggregate total of each activity can produce the agitation level of the developer. Other means of generating an agitation level can be used that are suitable for determining an appropriate agitation level based on the activity data.

A developer context is generated by the code analyzer 140 using the software code. This is illustrated at step 440. In some embodiments, the software code is separated between developer comments and actual source code. The developer comments and the source code can be evaluated independently and together to generate a developer context. Special annotations left by the developer are also analyzed to determine which segments of the code are available for evaluation and which segments are excluded. Information regarding the software code can include how many lines of code were written to perform a particular function, the types of objects used, the types of function calls used, and how often features of the programming language were enabled.

The agitation level and the developer context are provided to a software development provider. This is illustrated at step 450. This information can be used to determine which aspects of the programming language are useful to a developer and which aspects are deficient. A software development provider can utilize that information to provide updates, wikis, tutorials, and other tools to better serve the developers using the programming language. A software development provider can analyze the agitation level in conjunction with a developer context to get a better understanding as to what features are lacking or difficult to comprehend. In some embodiments, only the agitation level is provided to a software development provider, and in some other embodiments, only the developer context is provided. The amount, type, and frequency of information provided can be dependent on either the developer or software development provider.

Figure 5:
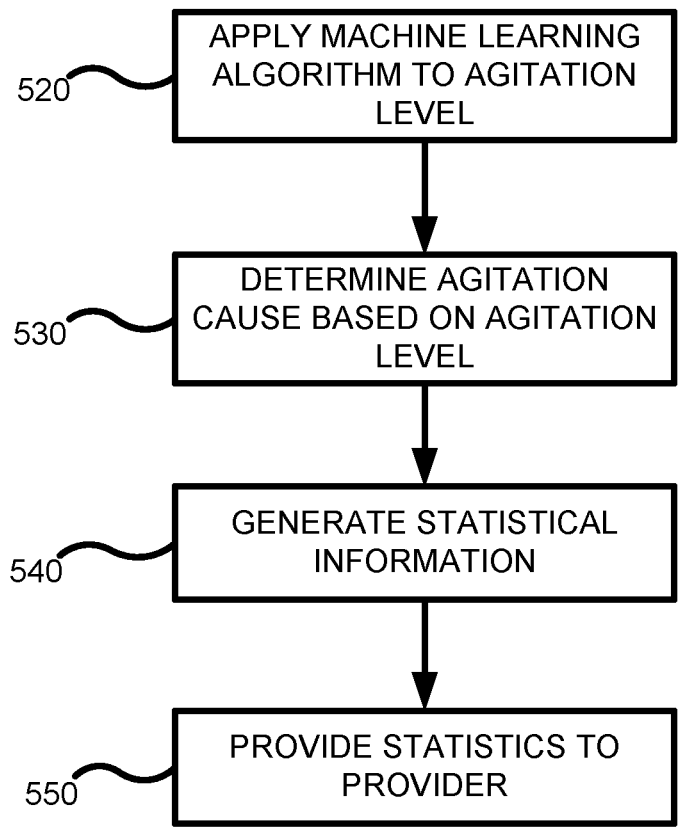
FIG. 5 is a flow diagram illustrating a process of generating statistical information, according to embodiments of the present disclosure.

FIG. 5 is a flow diagram illustrating a process 500 for generating an agitation cause and statistics, according to embodiments of the present disclosure. To illustrate process 500, FIG. 5 is described within the context of the agitation detection and response system 110 of FIG. 1.

The machine learning component 150 applies an agitation level of the agitator 130 and a developer context of the code analyzer 140 to a machine learning algorithm. This is illustrated at step 520. The machine learning algorithm can collect and analyze data based various factors for each segment of a programming language. Based on the data received, such as the agitation level, the machine learning algorithm can formulate an agitation cause. This is illustrated at step 530. Several possibilities can be determined as the agitation cause. For example, documentation of features may be lacking, a popular feature may be absent in a particular geographic area known to use the feature, insufficient examples, unconventional function implementation. In some embodiments, based on the agitation cause, the agitation detection and response system 110 flags language functions that are determined to be the cause of the agitation.

The agitation system and response system 110 aggregates captured data onto a server and generates statistical information based on the captured data. This is illustrated at step 540. The capture data can include activities, sensor data, agitation levels, agitation causes, developer context, and software code. The capture data can be separated by category and compiled with other developer information using the same programming language as well other programming languages. The statistical information can include which features are the most frequently used, the average time taken to utilize a feature, the time taken to write a function, and other information that may be useful to a developer and/or a software development provider.

The statistical information is provided to a software development provider. This is illustrated at step 550. In some embodiments, the statistical information provided to the software development provider is anonymized by removing individual developer information. The statistical information can also be provided and shared to developers as well as provided to a community forum server.

In some embodiments, the notifier 160 receives a personalized notification from a software development provider based on the statistical information provided to the software development provider. The personalized notification can include information as to what changes to the programming language have occurred as well as tips on how the developer can better utilize the features of the language.

Figure 6:
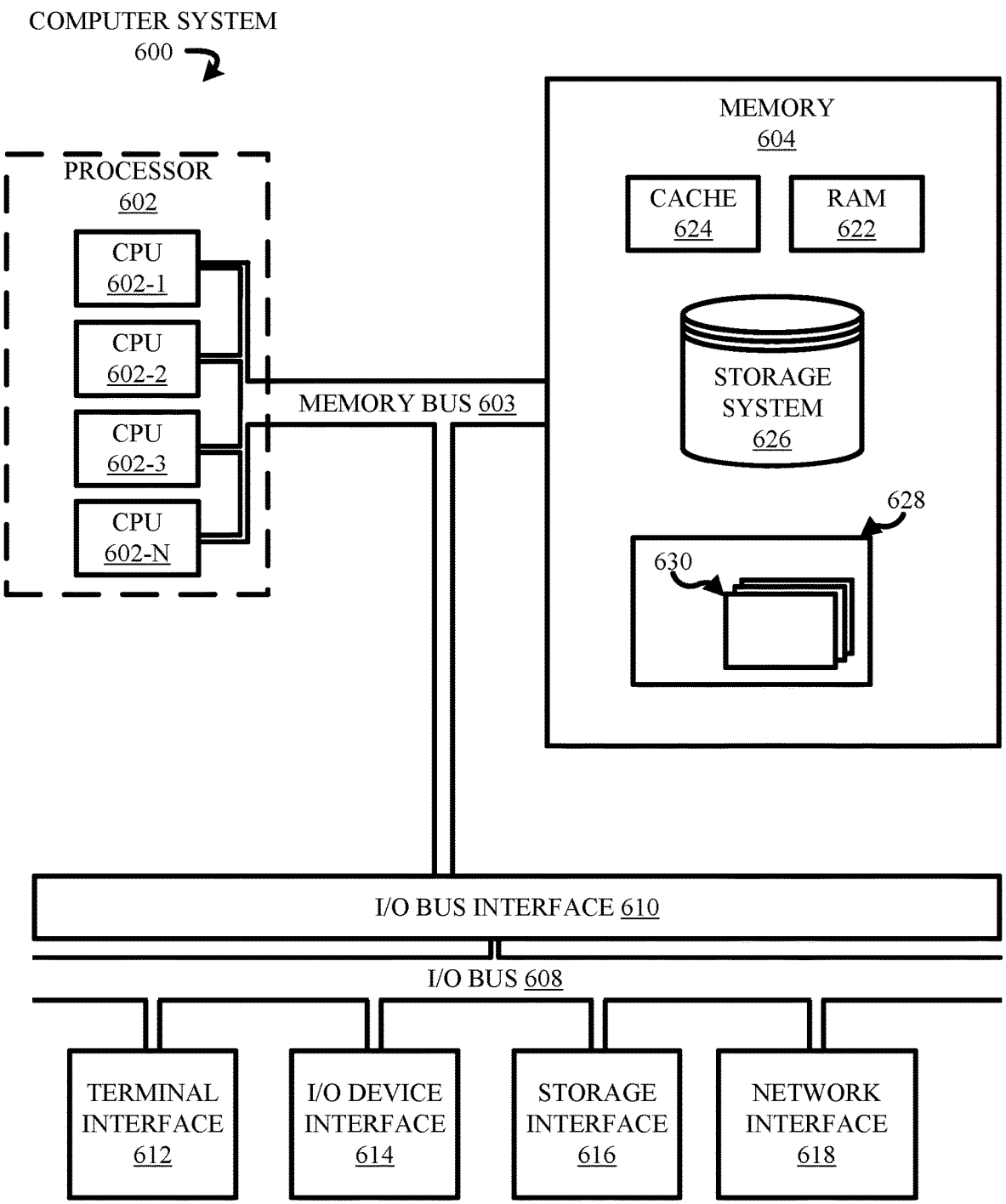
FIG. 6 is a high-level block diagram illustrating an example computer system that may be used in implementing one or more of the methods, tools, and modules, and any related functions, described herein, in accordance with embodiments of the present disclosure.

Referring now to FIG. 6, shown is a high-level block diagram of an example computer system 600 (e.g., computing environment 100, agitation detection and response system 110) that may be used in implementing one or more of the methods, tools, and modules, and any related functions, described herein (e.g., using one or more processor circuits or computer processors of the computer), in accordance with embodiments of the present disclosure. In some embodiments, the major components of the computer system 600 may comprise one or more processors 602, a memory 604, a terminal interface 612, a I/O (Input/Output) device interface 614, a storage interface 616, and a network interface 618, all of which may be communicatively coupled, directly or indirectly, for inter-component communication via a memory bus 603, a I/O bus 608, and an I/O bus interface 610.

The computer system 600 may contain one or more general-purpose programmable central processing units (CPUs) 602-1, 602-2, 602-3, and 602-N, herein generically referred to as the processor 602. In some embodiments, the computer system 600 may contain multiple processors typical of a relatively large system; however, in other embodiments the computer system 600 may alternatively be a single CPU system. Each processor 602 may execute instructions stored in the memory 604 and may include one or more levels of on-board cache.

The memory 604 may include computer system readable media in the form of volatile memory, such as random-access memory (RAM) 622 or cache memory 624. Computer system 600 may further include other removable/non-removable, volatile/non-volatile computer system storage media. By way of example only, storage system 626 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, the memory 604 can include flash memory, e.g., a flash memory stick drive or a flash drive. Memory devices can be connected to memory bus 603 by one or more data media interfaces. The memory 604 may include at least one program product having a set (e.g., at least one) of program modules that are configured to carry out the functions of various embodiments.

Although the memory bus 603 is shown in FIG. 6 as a single bus structure providing a direct communication path among the processors 602, the memory 604, and the I/O bus interface 610, the memory bus 603 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 608 are shown as single respective units, the computer system 600 may, in some embodiments, contain multiple I/O bus interfaces 610, multiple I/O buses 608, or both. Further, while multiple I/O interface units are shown, which separate the I/O bus 608 from various communications paths running to the various I/O devices, in other embodiments some or all of the I/O devices may be connected directly to one or more system I/O buses.

In some embodiments, the computer system 600 may be a multi-user mainframe computer system, a single-user system, or a server computer or similar device that has little or no direct user interface but receives requests from other computer systems (clients). Further, in some embodiments, the computer system 600 may be implemented as a desktop computer, portable computer, laptop or notebook computer, tablet computer, pocket computer, telephone, smart phone, network switches or routers, or any other appropriate type of electronic device.

It is noted that FIG. 6 is intended to depict the representative major components of an exemplary computer system 600. In some embodiments, however, individual components may have greater or lesser complexity than as represented in FIG. 6, components other than or in addition to those shown in FIG. 6 may be present, and the number, type, and configuration of such components may vary.

One or more programs/utilities 628, each having at least one set of program modules 630 may be stored in memory 604. The programs/utilities 628 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Programs 628 and/or program modules 630 generally perform the functions or methodologies of various embodiments.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used, and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

Different instances of the word "embodiment" as used within this specification do not necessarily refer to the same embodiment, but they may. Any data and data structures illustrated or described herein are examples only, and in other embodiments, different amounts of data, types of data, fields, numbers and types of fields, field names, numbers and types of rows, records, entries, or organizations of data may be used. In addition, any data may be combined with logic, so that a separate data structure may not be necessary. The previous detailed description is, therefore, not to be taken in a limiting sense.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present disclosure has been described in terms of specific embodiments, it is anticipated that alterations and modification thereof will become apparent to the skilled in the art. Therefore, it is intended that the following claims be interpreted as covering all such alterations and modifications as fall within the true spirit and scope of the disclosure.

What is claimed is:

1. An agitation detection and response system, comprising:
    a developer analyzer configured to capture activities performed by a developer;

an agitator configured to generate an agitation level of the developer based on the activities, wherein the agitation level indicates a difficulty within a segment of a programming language;

a code analyzer configured to capture software code written by the developer as the activities were performed and to generate a developer context based at least partially on the software code, wherein the developer context includes insight in the software code written by the developer;

a machine learning component configured to generate an agitation cause based at least partially on the agitation level and the developer context; and a server configured to aggregate the developer context and the agitation level, the server further configured to generate aggregated data based on the developer context and the agitation level and provide anonymized statistical data based on the aggregated data to the software development provider, wherein the aggregated data includes similar data from other developers using the programming language.

2. The system of claim 1, wherein the developer analyzer includes a cursor movement analyzer, a developer gaze sensor, and physical sensors configured to detect the activities.

3. The system of claim 1, wherein the developer context includes developer comments and source code.

4. The system of claim 1, further comprising:
a notifier configured to receive a response from a developer community server and a personalized notification from a software development provider.

5. The system of claim 1, wherein the server is further configured to generate data statistics based on the aggregated data.

6. A method comprising:
collecting software code and activity data pertaining to one or more activities performed by a developer using a segment of a programming language;
evaluating the activity data to generate an agitation level, wherein the agitation level relates to the developer when the developer uses the segment;
generating a developer context by evaluating the software code;
providing the agitation level and the developer context to a software development provider, wherein the agitation level indicates a difficulty within a segment of the programming language;
aggregating the developer context and the agitation level onto a server to generate aggregated data, wherein the aggregated data includes similar data from other developers using the programming language; and
providing anonymized statistical data based on the aggregated data to the software development provider.

7. The method of claim 6, wherein generating the developer context comprises:
separating the software code by developer comments and lines of code;
analyzing the developer comments and the lines of code; and
creating the developer context from analyzing the developer comments and the lines of code.

8. The method of claim 6, further comprising:
generating an agitation cause based on the agitation level and the developer context;
sending the agitation cause to a developer community server;
retrieving a community response from the developer community server; and
providing the community response to the developer.

9. The method of claim 6, further comprising:
generating data statistics based on the aggregated data;
comparing the data statistics with a second data statistic of a different programming language to generate a language comparison; and
providing the language comparison to the software development provider.

10. The method of claim 6, further comprising:
comparing the agitation level with an agitation benchmark to determine a deviation, wherein the agitation benchmark relates to an average agitation level corresponding to the activities a typical developer experiences when using the segment of the programming language;
generating a course of action by evaluating the deviation and the activities, wherein the course of action reduces the deviation; and
providing the course of action to the software development provider.

11. The method of claim 10, wherein the agitation benchmark is adjusted to correspond to a skill level of the developer.

12. The method of claim 6, further comprising:
receiving an update notification regarding the segment of the programming language; and
providing the developer with the update notification.

13. The method of claim 6, wherein a portion of the software code is annotated by the developer to prevent analysis of the portion of the software code.

14. A computer program product for agitation detection, the computer program product comprising a computer readable storage medium having program instructions embodied therewith, the program instructions executable by a processor to cause the processor to:
collect software code and activity data pertaining to one or more activities performed by a developer using a segment of a programming language;
evaluate the activity data to generate an agitation level, wherein the agitation level relates to the developer when the developer uses the segment;
generate a developer context by evaluating the software code;
provide the agitation level and the developer context to a software development
provider, wherein the agitation level indicates a difficulty within a segment of the programming language;
aggregate the developer context and the agitation level onto a server to generate aggregated data, wherein the aggregated data includes similar data from other developers using the programming language; and
provide anonymized statistical data based on the aggregated data to the software development provider.

15. The computer program product of claim 14, wherein the program instructions configured to generate the developer context further comprise instructions to cause the processor to:
separate the software code by developer comments and lines of code;
analyze the developer comments and the lines of code; and
create the developer context from analyzing the developer comments and the lines of code.

16. The computer program product of claim 14, further comprising program instructions to cause the processor to:

generate an agitation cause based on the agitation level and the developer context;
send the agitation cause to a developer community server;
retrieve a community response from the developer community server; and
provide the community response to the developer.

17. The computer program product of claim 14, further comprising program instructions to cause the processor to:
generate data statistics based on the aggregated data;
compare the data statistics with a second data statistic of a different programming language to generate a language comparison; and
provide the language comparison to the software development provider.

* * * * *